(12) United States Patent
Chou

(10) Patent No.: US 10,595,190 B2
(45) Date of Patent: Mar. 17, 2020

(54) VIRTUAL MOBILE MANAGEMENT ENTITY MANAGEMENT

(71) Applicant: INTEL IP CORPORATION, Santa Clara, CA (US)

(72) Inventor: Joey Chou, Scottsdale, AZ (US)

(73) Assignee: Apple Inc., Cupertino, CA (US)

(*) Notice: Subject to any disclaimer, the term of this patent is extended or adjusted under 35 U.S.C. 154(b) by 27 days.

(21) Appl. No.: 15/741,285

(22) PCT Filed: Dec. 23, 2015

(86) PCT No.: PCT/US2015/000252
§ 371 (c)(1),
(2) Date: Jan. 1, 2018

(87) PCT Pub. No.: WO2017/018965
PCT Pub. Date: Feb. 2, 2017

(65) Prior Publication Data
US 2018/0206108 A1    Jul. 19, 2018

Related U.S. Application Data

(60) Provisional application No. 62/197,447, filed on Jul. 27, 2015.

(51) Int. Cl.
*H04W 8/12* (2009.01)
*H04W 28/08* (2009.01)

(52) U.S. Cl.
CPC .............. *H04W 8/12* (2013.01); *H04W 28/08* (2013.01)

(58) Field of Classification Search
CPC ................................ H04W 8/12; H04W 28/08
See application file for complete search history.

(56) References Cited

U.S. PATENT DOCUMENTS

| | | | |
|---|---|---|---|
| 5,317,742 A * | 5/1994 | Bapat | G06F 16/289 707/714 |
| 6,434,619 B1 * | 8/2002 | Lim | H04L 41/0213 709/200 |
| 2012/0034942 A1 * | 2/2012 | Lin | H04L 41/042 455/509 |

(Continued)

OTHER PUBLICATIONS

3GPP, "Evolved Packet Core (EPC) Network Resource Model (NRM) Integration Reference Point (IRP); Information Service (IS) (Release 10)," 3GPP TS 32.752 V10.2.0 (Year: 2012).*

(Continued)

*Primary Examiner* — Michael Thier
*Assistant Examiner* — Nevena Zecevic Sandhu
(74) *Attorney, Agent, or Firm* — Stoel Rives LLP

(57) ABSTRACT

The present disclosure provides systems for instantiating and terminating a MME VNF. The MME VNF is instantiated and/or terminated using an EM, a NM, a VNFM, a VIM, a NFVO and/or a catalog. Instantiating an MME VNF includes on-boarding the VNF package, creating a managed element, executing the enabled VNF package, instantiating the MME VNF instance, creating the MME function and modifying the MME pool to add the MME VNF instance. Terminating the MME VNF includes decommissioning the MME VNF services, modifying the MME pool to remove the MME VNF from the MME pool, and terminating the MME VNF instance.

15 Claims, 8 Drawing Sheets

(56) References Cited

U.S. PATENT DOCUMENTS

| | | | |
|---|---|---|---|
| 2013/0229914 A1* | 9/2013 | Suerbaum | H04W 24/02 370/229 |
| 2015/0109995 A1* | 4/2015 | Mathai | H04L 61/1511 370/328 |
| 2015/0222515 A1* | 8/2015 | Mimura | H04L 43/0876 709/224 |
| 2016/0344587 A1* | 11/2016 | Hoffmann | H04W 24/02 |
| 2016/0381150 A1* | 12/2016 | Rajagopal | G06F 9/45558 709/223 |
| 2017/0006083 A1* | 1/2017 | McDonnell | H04L 67/06 |
| 2017/0012823 A1* | 1/2017 | Zhu | H04W 28/08 |
| 2017/0012968 A1* | 1/2017 | Feng | H04L 12/6418 |
| 2017/0142624 A1* | 5/2017 | Brown | H04W 36/12 |
| 2017/0244596 A1* | 8/2017 | Chen | H04W 88/18 |
| 2017/0272354 A1* | 9/2017 | Chen | H04L 43/50 |
| 2017/0346676 A1* | 11/2017 | Andrianov | H04L 41/0631 |
| 2018/0026858 A1* | 1/2018 | Zhang | H04L 41/00 709/226 |
| 2018/0034709 A1* | 2/2018 | Chen | H04L 41/32 |
| 2018/0070262 A1* | 3/2018 | Nakano | H04W 28/24 |

OTHER PUBLICATIONS

3GPP TR 32.842, "3rd Generation Partnership Project; Technical Specification Group Services and System Aspects; Telecommunication management; Study on network management of virtualized networks", (Release 13), V 1.1.0, May 2015, 57 pages.

GS NFV-MAN 001, "Network Function Virtualization (NFV) Management and Orchestration", ESTI, V 0.6.3, Sep. 2014, 197 pages.

Intel, "pCR MME overload mitigation by MME VNF procedure", S5-152015, 3GPP TSG SA WG5 (Telecom Management) Meeting #98bis, Beijing China, Agenda Item 6.6.3, Jan. 27-29, 2015, 3 pages.

Intel, "pCR MME VNF Instantiation and termination for mixed network", S5-144250, 3GPP TSG SA WG5 (Telecom Management) Meeting #96, Sophia Antipolis, France, Agenda Item 6.9.4, Aug. 18-22, 2014, 5 pages.

PCT/US2015/000252, International Search Report and Written Opinion, dated Apr. 28, 2016, 13 pages.

3GPP TSG SA Meeting #58, "SA WG5 28.622 Telecommunication management; Generic Network Resource Model (NRM) Integration Reference Point (IRP); Information Service (IS)", TD SP-120804, SA WG5, Agenda Item 12.30, Dec. 10-12, 2012, 23 pages.

Ericsson, "pCR on TR 32.842 regarding VNF model", 3GPP TSG SA WG5 (Telecom Management) Meeting #101, S5-153173, revision of S5-153abc, Ljubljana (Slovenia), Agenda Item 6.5.3, May 25-29, 2015, 4 pages.

Hitachi, "MME FQDN Clarification", 3GPP TSG CT WG4 Meeting #60, C4-130378, was C4-130082, San Jose Del Cabo, Mexico, Jan. 28-Feb. 1, 2013, 2 pages.

Huawei, Kddi, "Add general description for dashed box in Management procedures", 3GPP TSG SA WG5 (Telecom Management) Meeting #101. S5-153357, revision of S5-153300, Ljubljana (Slovenia), Agenda Item 6.5.3, May 25-29, 2015, 10 pages.

Intel, China Mobile, ZTE, "pCR MME overload mitigation by MME VNF procedure", 3GPP TSG SA WG5 (Telecom Management) Meeting #101 S5-153338 (Revision of S5-153094, S5-153338), Ljubljana, Slovenia, Agenda Item 6.5.3, May 25-29, 2015, 4 pages.

ZTE, China Mobile, "Generic NRM for virtual network", 3GPP TSG SA WG5 (Telecom Management) Meeting #101, S5-153321, revision of S5-153129, Ljubljana (Slovenia), Agenda Item 6.5.3, May 25-29, 2015, 4 pages.

ETSI GS NFV-MAN 001, "Network Functions and Virtualisation (NFV); Management and Orchestration", V1.1.1, Dec. 2014, 184 pages.

* cited by examiner

VIRTUAL MOBILE MANAGEMENT ENTITY MANAGEMENT

RELATED APPLICATIONS

This application is a national stage filing under 35 U.S.C. § 371 of International Patent Application No. PCT/US2015/000252, filed Dec. 23, 2015, which claims the benefit of U.S. Provisional Patent Application No. 62/197,477, filed Jul. 27, 2015, each of which is hereby incorporated by reference herein in its entirety.

TECHNICAL FIELD

The present disclosure relates to the management of a virtual mobile management entity. In particular, the present disclosure relates to the instantiation and termination of a virtual mobile management entity.

BACKGROUND

Mobile management entity (MME) load balancing and re-balancing functions allow user equipment (UE) located in an MME pool to be directed to an appropriate MME in a manner that the connections between the UE and the MME are evenly distributed among the MMEs in the MME pool. Since the number of MMEs in the MME pool is static, an MME can be overloaded as the number of UEs entering the networks keeps rising.

DETAILED DESCRIPTION OF PREFERRED EMBODIMENTS

Figure 1:
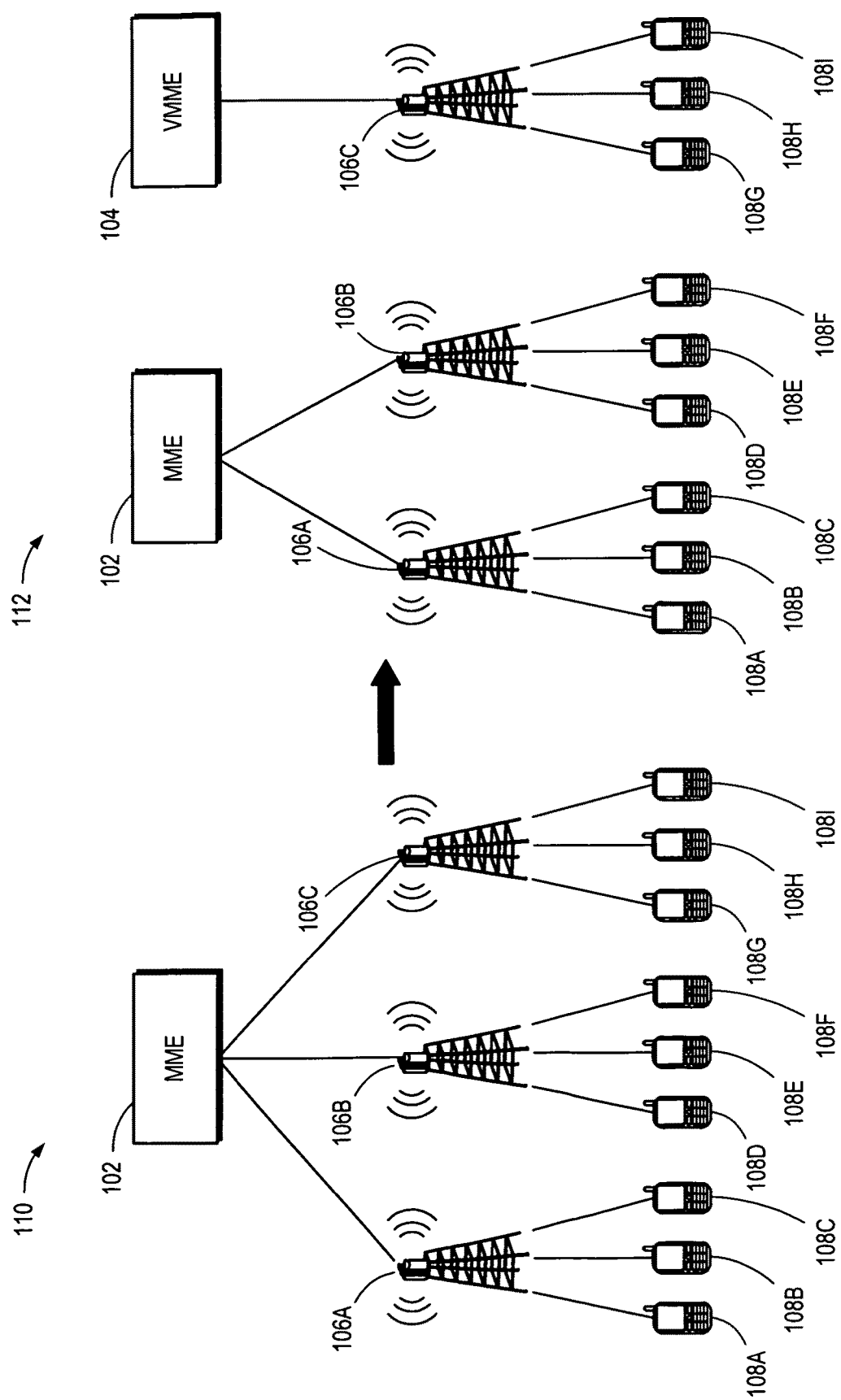
FIG. 1 is a system diagram for virtual mobile management entity management according to one embodiment.

Wireless mobile communication technology uses various standards and protocols to transmit data between a base station and a wireless communication device. Wireless communication system standards and protocols can include, for example, a 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi. In an 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in the E-UTRAN, which communicate with a wireless communication device, known as user equipment (UE). In LTE networks, the E-UTRAN may include a plurality of eNodeBs and may communicate with the plurality of UEs. LTE networks include a radio access technology (RAT) and core radio network architecture that can provide high data rate, low latency, packet optimization, and improved system capacity and coverage.

In one embodiment, a virtual mobile management entity (VMME) is instantiated to load balance UEs across a number of mobile management entities (MMEs) in an MME pool. The VMME can also be terminated if the resources offered by the VMME are no longer needed to support the UEs being serviced by the MMEs in the MME pool.

The instantiation and/or termination of the VMME is coordinated by a network manager (NM). The NM communicates with an element manager (EM), a virtual network function manager (VNFM), a virtual infrastructure manager (VIM), a network function virtualization orchestrator (NFVO), and/or a catalog. The NM, EM, VNFM, VIM, NFVO, and catalog are further described in association with FIGS. 3 and 4.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a system diagram for VMME management according to one embodiment. FIG. 1 includes the MME 102, the VMME 104, a plurality of eNBs, and a plurality of UE. A plurality of eNBs include eNB 106A, eNB 106B, and eNB 106C, which are referred to herein as the eNBs 106. A plurality of UEs include UE 108A, UE 108B, UE 108C, UE 108D, UE 108E, UE 108F, UE 108G, UE 108H, and UE 108I, which are referred to herein as the UEs 108.

FIG. 1 shows the load balancing of the UEs 108 between the MME 102 and the VMME 104. For example, at a first instance of time 110 the resources provided by the MME 102 can be strained by the services provided to the UEs 108. At a second instance of time 112, some of the UEs 108 (e.g., the UEs 108G, 108H, 108I) that were previously serviced by the MME 102 are serviced by the VMME 104.

The UEs 108 may include any type of communications and/or computing device. Examples of the UEs 108 include phones, smartphones, personal digital assistants (PDAs), tablet computers, notebook computers, ultrabook computers, and the like. The UEs 108 may include a plurality of applications installed and running on the UEs 108 which may periodically communicate data over the E-UTRAN and/or an evolved packet core (EPC). The UEs 108 may include devices configured to communicate using the 3GPP standard such as a universal mobile telecommunication system (UMTS), LTE, LTE-Advanced (LTE-A), or the like. In some embodiments, the UEs 108 may include a mobile wireless device configured to communicate based on any other wireless communication standard.

The MME 102 comprises dedicated hardware and computer readable instructions to perform a plurality of operations. For example, the MME 102 can be a signaling node in the EPC. The MME 102 initiates paging and authentication of the UEs 108. The MME 102 retains location information at the tracking area level for each of the UEs 108 and selects the appropriate gateway during the initial registration process. The MME 102 connects to the eNBs 106 through an interface. For example, the MME 102 can connect to the eNBs 106 via an S1 interface, although a number of other interfaces can be used to establish a connection between the MME 102 and the eNBs 106. Multiple MMEs can be grouped together in a pool to meet increasing signaling load in the network. The MME 102 can also be referred to as an MME physical network function (PNF) because the MME PNF comprises dedicated hardware.

As used herein, hardware can refer to processing resources, memory resources, communication resources, and/or other resources needed to execute computer readable instructions. For example, processing resources can include a plurality of processors to execute computer readable instructions.

The eNBs 106 are a plurality of base stations that can include multiple antennas (e.g., a sector antenna array) to provide multiple-input multiple-output (MIMO) communication channels that increase transmission capacity and quality. The eNBs 106 provide a unicast transmission to the UEs 108 within their cell coverage area. The unicast transmission may be over two or more MIMO layers from the eNBs 106 to the UEs 108.

At the first instance of time 110, the MME 102 is connected to the eNBs 106A, 106B, 106C. The eNB 106A is connected to the UEs 108A, 108B, 108C. The eNB 106B is connected to the UEs 108D, 108E, 108F. The eNB 106C is connected to the UEs 108G, 108H, 108I. As such, the MME 102 can provide services to the UEs 108A, 108B, 108C, 108D, 108E, 108F, 108G, 108H, 108I.

The services provided by the MME 102 to the UEs 108 can strain the MME 102. That is, the MME 102 may not be able to effectively provide services to the UEs 108. The MME 102 can effectively provide services to UEs based on key indicators. That is, when the key indicators fall below a baseline, then the MME 102 can be said to be ineffective in providing services to the UEs 108.

To alleviate the demands on the MME 102. A new MME (not shown) can be placed in an MME pool to which the MME 102 belongs. However, procuring and installing the new MME PNF can have negative effects. For example, the cost associated with procuring the new MME PNF can be limiting. The time associated with installing the new MME PNF can leave UEs 108 without adequate services for the duration of the install.

Instead of installing the new MME PNF, the VMME 104 can be instantiated to alleviate the demands on the MME 102. The VMME can also be referred to as a mobile management entity virtual network function (MME VNF) to differentiate the VMME from the MME PNF by accentuating that the VMME is implemented in general purpose hardware instead of dedicated hardware. That is, the computer readable instructions comprised in the MME 102 can be implemented in a virtual environment and executed in general purpose hardware to constitute the VMME.

Figure 3:
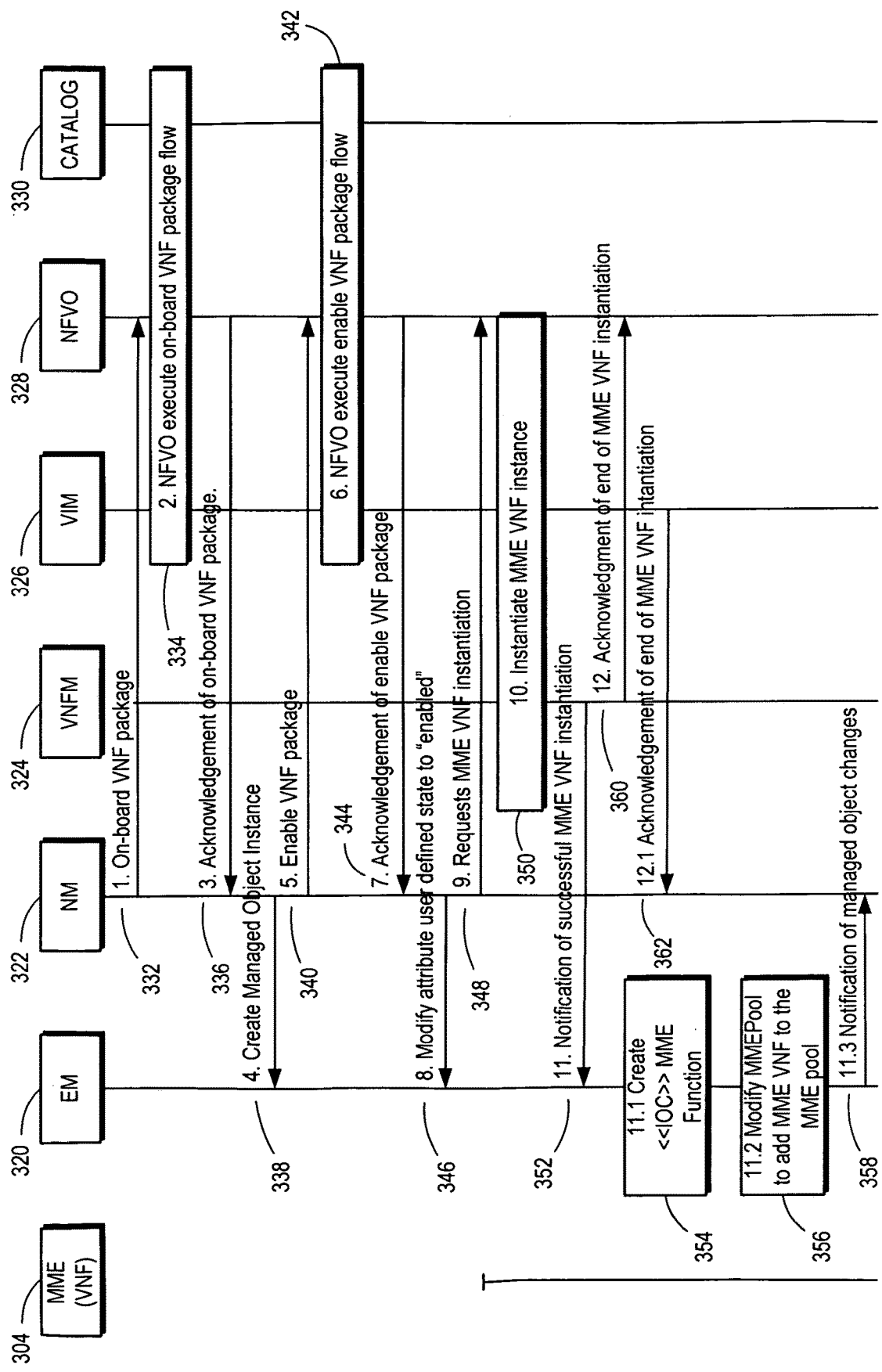
FIG. 3 is a timing diagram for instantiating a virtual mobile management entity according to one embodiment.

For example, at the second instance of time 112, the MME 102 is connected to the eNBs 106A, 106B. The VMME 104, is connected to the eNB 106C. That is, a connection between the MME 102 and the eNB 106C can be terminated and a connection between the VMME 104 and the eNB 106C can be established. Accordingly, the UEs 108G, 108H, 108I can receive services from the VMME 104 instead of the MME 102 at the second instance of time 112. FIG. 3 further describes the instantiation of the VMME 104 and the migration of the UEs 108 to the VMME 104.

In some examples, the MME 102 and the VMME 104 can be housed in a same location or can be housed in different locations. For example, the MME 102 and the VMME 104 can be directly coupled to each other or the MME 102 and the VMME 104 can communicate with each other via the world wide web.

Figure 2:
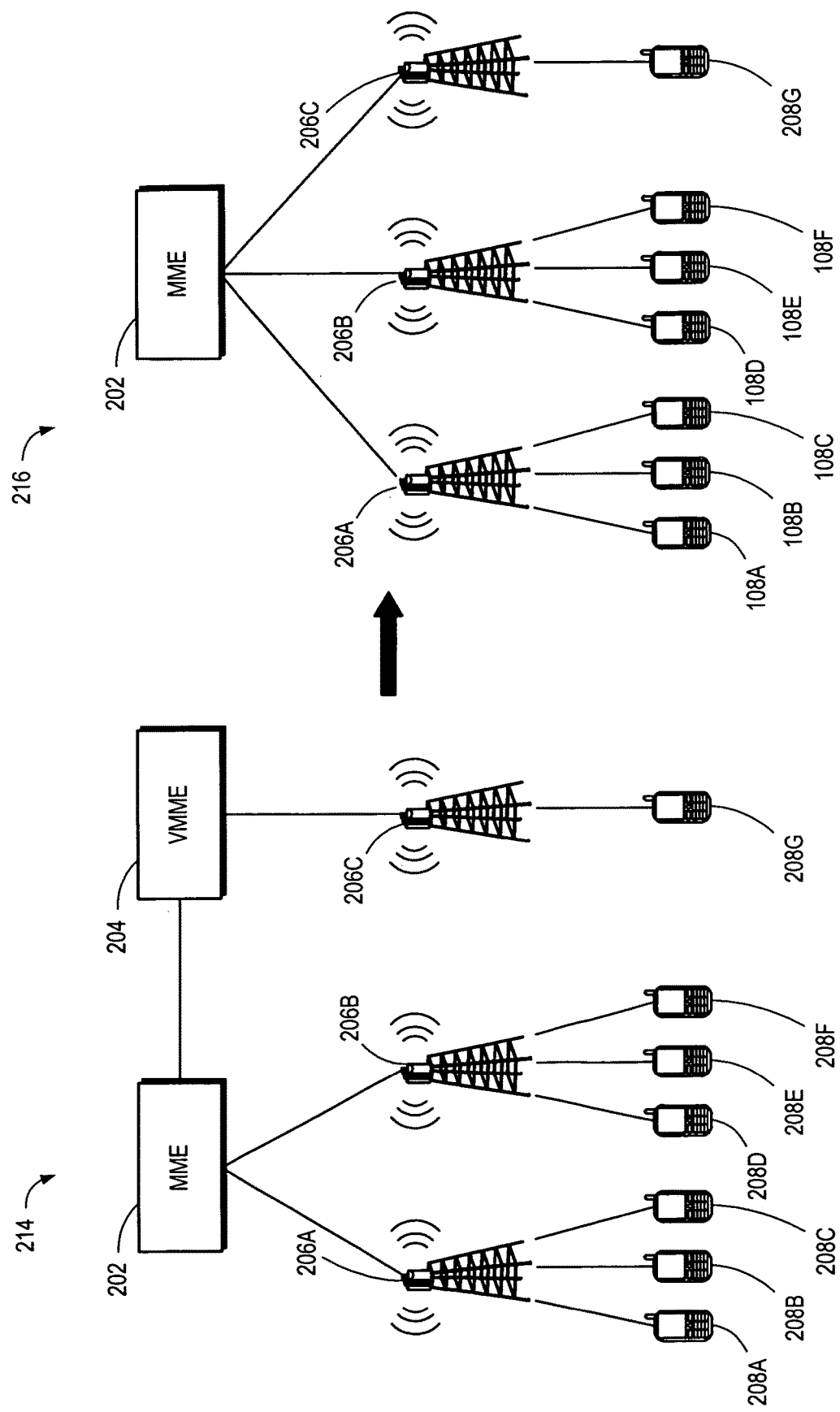
FIG. 2 is a system diagram for virtual mobile management entity management according to one embodiment.

FIG. 2 is a system diagram for VMME 204 management according to one embodiment. In FIG. 2, an MME 202, the VMME 204, a plurality of eNBs 206A, 206B, 206C (e.g., referred to generally as the eNBs 206), and a plurality of UEs 208A, 208B, 208C, 208D, 208E, 208F, 208G (e.g., referred to generally as the UEs 208) are analogous to the MME 102, the VMME 104, the eNBs 106A, 106B, 106C, and the UEs 108A, 108B, 108C, 108D, 108E, 108F, 108G in FIG. 1.

In FIG. 2, the connection between the VMME 204 and the UEs 108H, 108I in FIG. 1 has been lost. That is, the VMME 204 no longer provides services to the UEs 108H, 108I. As such, the MME 202 is capable of providing services to the UEs 208.

Rather than providing resources that are not being consumed by maintaining the VMME 204 active status, the VMME 204 can be deactivated. For example, at a first instance of time 214, the VMME 204 provides services to the UE 208G via the eNB 206C. The MME 202 provides services to the UEs 208A, 208B, 208C, 208D, 208E, 208F. It can be determined whether the MME 202 can offer services to the UE 208G without negatively impacting the UEs 208A, 208B, 208C, 208D, 208E, 208F. If the MME 202 can offer services to the UE 208G without negatively impacting the UEs 208A, 208B, 208C, 208D, 208E, 208F, then the MME 202 can be configured to provide services to the UE 208G by migrating the UE 208G to the MME 202 as reflected at a second instance of time 216.

Figure 4:
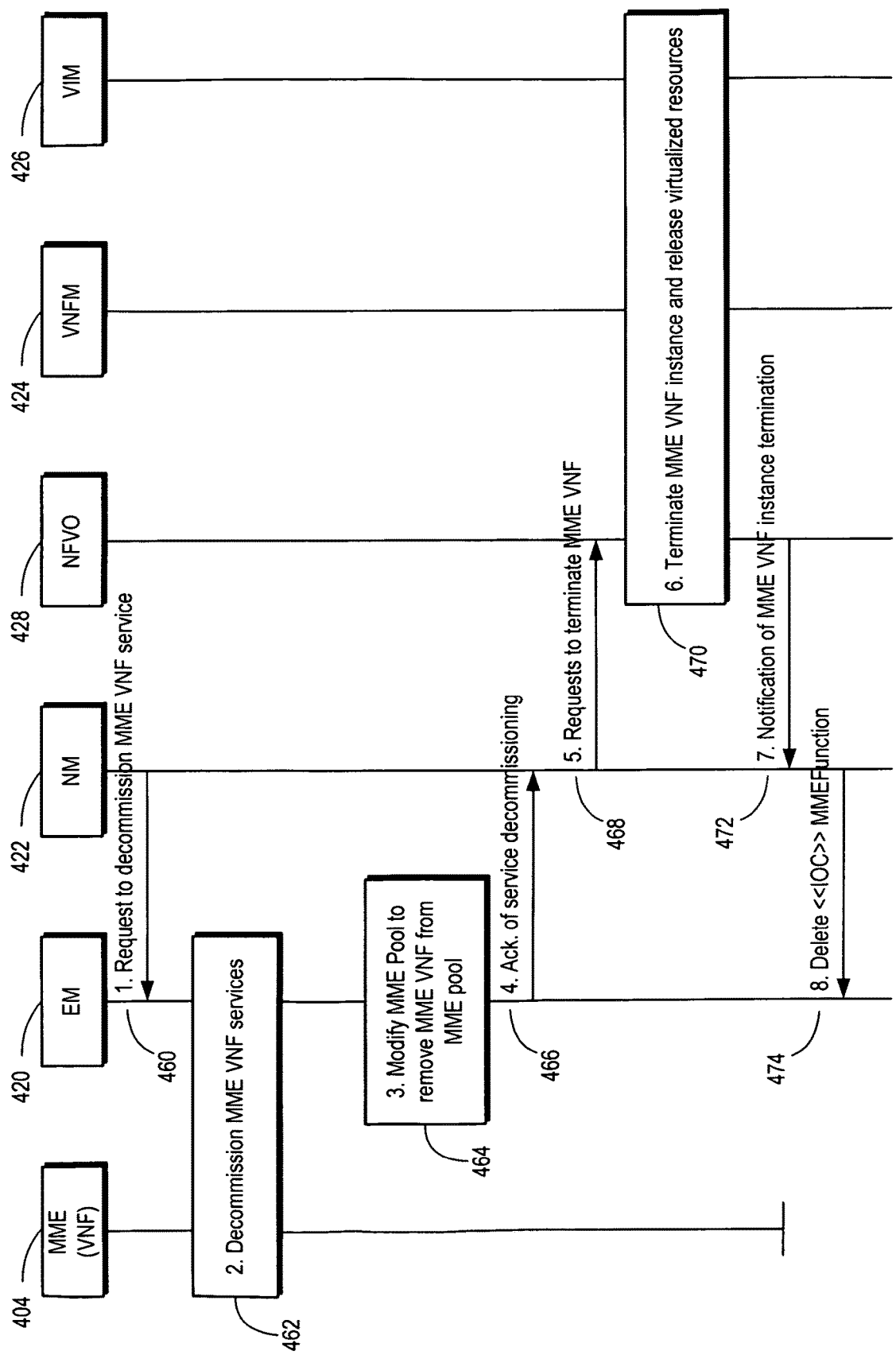
FIG. 4 is a timing diagram for terminating a virtual mobile management entity according to one embodiment.

At the second instance of time 216, the VMME 204 can be terminated when the eNB 206C and the UE 208G have been connected to the MME 202. Terminating the VMME 204 can provide flexibility in load balancing. UEs. Terminating the VMME 204 can also conserve resources needed to implement the VMME 204. FIG. 4 further describes the termination of the VMME 204 and the migration of the UEs to the MME 202.

FIG. 3 is a timing diagram for instantiating a virtual mobile management entity according to one embodiment. FIG. 3 includes an MME VNF 304 that is analogous to the VMME 104 and the VMME 204 in FIGS. 1 and 2, respectively. FIG. 3 also includes an EM 320, an NM 322, a VNFM 324, a VIM 326, an NFVO 328, and a catalog 330. In FIG. 3 the time line of the MME VNF 304 begins at a different location than the other time lines to show an instantiation 350 of the MME VNF 304.

One or more of the MME VNF 304, the EM 320, the NM 322, the VNFM 324, the VIM 326, the NFVO 328, and/or the catalog 330 includes at least one computer-readable storage medium having stored thereon computer-readable instructions, when executed, to implement any of the processes disclosed herein.

The NM 322 comprises hardware and computer readable instructions to manage a mobile communication network that includes the MME and the MME VNF 304. The EM 320 comprises hardware and computer readable instructions to manage the elements in the mobile communication network.

The elements managed by the EM 320 include the MME and/or the MME VNF 304. The VNFM 324 and the VIM 326 include hardware and computer readable instructions to manage the use of the virtual resources and to instantiate the MME VNF 304 instance. The NFVO 328 orchestrates the instantiation and the termination of virtual elements, such as the MME VNF 304, by communication with the VNFM 324 and/or the VIM 326. The catalog 330 includes a repository of computer readable instructions that can be used to create the MME VNF 304. The catalog 330 can be a database and/or a different type of computer implemented storage system.

Instantiating the MME VNF 304 can include on-boarding 332 the VNF package, acknowledging 336 the onboarding of the VNF package, creating 338 a managed object instance, enabling 340 the VNF package. Instantiating the MME VNF 304 can also include executing (e.g., enabling) 342 the VNF package flow, acknowledging 344 the enablement of the VNF package, modifying 346 the attributes of the user defined state to "enabled", requesting 348 MME VNF 304 instantiation, instantiating 350, the MME VNF 304 instance, notifying 352 of the successful MME VNF 304 instantiation, and acknowledging 360, 362 the end of the MME VNF 304 instantiation. Instantiating the MME VNF 304 can also include creating 354 the MME function, modifying an MME pool 356, and providing a notification 358 of the managed object changes.

On-boarding 332 the VNF package includes the VNF package in the catalog 330. The NM 322 initiates the on-boarding of the VNF package. For example, the NM 322 requests that the NFVO 328 on-board the VNF package. As previously discussed, the NM 322 can include electronic memory and one or more processors configured to access the electronic memory to perform a number of operations such as on-boarding the VNF package. The NFVO 328 can on-board the VNF package by accessing the catalog 330 and adding the VNF package to the catalog 330. In a number of examples, the NFVO 328 can request that the VIM 326 on-board the VNF package to the catalog 330.

Acknowledging 336 the on-boarding of the VNF package can include providing and/or receiving a notification of a successful on-boarding of the VNF package. For example, the NFVO 328 can provide a notification to the NM 322 that the VNF package was on-boarded. In some embodiments, the EM 320, the NM 322, the VNFM 324, the VIM 326, the NFVO 328, and/or the catalog 330 can be hosted on a same system and/or on different systems. Communication between the EM 320, the NM 322, the VNFM 324, the VIM 326, the NFVO 328, and/or the catalog 330 can occur within a system and/or via a network. The network can be a local network and/or a world wide web.

Creating 338 the managed object instance includes creating a managed element object from an information object class (IOC) from an application program interface (API) used by the mobile communication system. The managed object instance can be a managed element object. An object refers to a software object. A software object refers to a variable, a data structure, and/or a function. For example, an object can refer to a particular instance of a class such that the object is a combination of variables, functions, and/or data structures. As such, creating the managed object instance includes creating an instance of the managed element class which results in the creation of the managed element object. The managed element object is created using the IOC. The managed element class is further described in FIG. 5.

The NM 322 requests that the EM 320 create the managed object instance. The request includes a vendor name for the vendorName attribute, a user defined state for the userDefinedState attribute, a software version for the swVersion attribute, a managed element type for the managedElementType attribute, and an image identification (ID) for the vnfImageId attribute. The user defined state is initially set to disabled. For example, the NM 322 can request the creation of the managed object instance and can request a modification of the user defined state to be set to disabled. The image ID uniquely identifies the managed object instance. The managed element type for the managed object instance is an MME. The EM 320 creates the managed object instance.

Enabling 340 the VNF package includes executing the enabled VNF package flow. The NM 322 requests that the NFVO 328 enable the VNF package. The NM 322 can provide the image ID of the created managed object instance. As such, the NM 322 requests the enablement of the VNF package including the image ID of the managed object instance created.

The NFVO 328 receives the request to enable the VNF package. The NFVO 328 executes 342 the enabled VNF package flow by accessing the catalog 330 and using the VIM 326.

The NFVO 328 acknowledges 344 the enablement of the VNF package by notifying the NM 322 of the enablement of the VNF package. The NM 322 receives the acknowledgement of the enablement of the VNF package.

The NM 322 requests the modification 346 of the attribute user defined state to "enabled" in response to receiving the acknowledgement 344 of the enablement of the VNF package.

The EM 320 receives the request for the modification 346 of the attribute user defined state. The EM 320 modifies the user defined state of the managed object instance to enabled.

The NM 322 requests 348 the MME VNF 304 instantiation. The NFVO 328 receives the request 348. The NFVO 328 instantiates 350 the MME VNF 304 instance by requesting that the VIM 326 create and start the virtual resources needed by the MME VNF 304. For example, the NFVO 328 requests the creation of a plurality of virtual machines (VM) used to instantiate the MME VNF 304. The VIM 326 creates and starts the VM resources. The NFVO 328 also requests the creation of the network resources needed for the MME VNF 304. The VIM 326 creates and starts the network resources. The VNFM 324 can assume management of the MME VNF 304 instance.

The VNFM 324 can notify 352 the EM 320 of the successful MME VNF 304 instantiation in response to the instantiation 350 of the MME VNF 304 instance. The EM 320 can receive the notification 352 of the successful MME VNF 304 instantiation.

The EM 320 creates 354 an MME function object using the IOC. The MME function is name-contained under the managed object instance (e.g., managed element object). That is, the MME function inherits from the managed object instance (e.g., managed element object). The MME function object represents the MME VNF instance.

The EM 320 modifies 356 the MME pool to add the MME VNF 304 to the pool. The EM 320 adds the MME VNF 304 to the MME pool by adding a domain name (DN) of the MME VNF 304 instance to the MME pool. The DN can be added to the MME pool by modifying the attributes of the MME pool. The member list attribute of the MME pool can be modified to include the DN of the MME function. The MME pool attribute of the MME function can be modified to include the DN of the MME pool.

The EM 320 can notify 358, the NM 322 of the managed object changes. The managed object changes can include the adding of the MME VNF 304 to the MME pool and the modification 356 of the member list attribute of the MME pool and the modification of the MME pool attribute of the MME function.

The VNFM 324 can acknowledge 360 the end of the MME VNF 304 instantiation by notifying the NFVO 328. The VIM 326 can acknowledge 362 the end of the VNF instantiation 350 by notifying the NM 322.

FIG. 4 is a timing diagram for terminating a virtual mobile management entity according to one embodiment. FIG. 4 includes an MME VNF 404, an EM 420, an NM 422, a VNFM 424, a VIM 426, an NFVO 428, and a catalog 430, which are analogous to the MME VNF 304, the EM 320, the NM 322, the VNFM 324, the VIM 326, the NFVO 328, and the catalog 330 in FIG. 3. In FIG. 4 the time line of the MME VNF 404 terminates at a different location than the other time lines to show a termination 470 of the MME VNF 404.

The termination 470 of the MME VNF 404 includes a decommission 460 of the MME VNF 404 instance, a modification 464 of the MME pool, and the termination 470 of the MME VNF 404 instance.

The NM 422 requests 460 the decommission of the MME VNF 404 services. This can occur, for example, when the services of the MME VNF 404 are no longer needed. The EM 420 receives the request 460 to decommission the MME VNF 404 services. The EM 420 can gracefully decommission the MME VNF 404 by migrating the UEs and/or eNBs to other MMEs and/or MME VNFs not being terminated. A graceful decommission includes terminating the MME VNF 404 without affecting the UEs and/or eNBs that were receiving services from the MME VNF 404.

Once the EM 420 has decommissioned the MME VNF 404, the EM 420 can modify 464 the MME pool to remove the MME VNF 404 from the MME pool. Removing the MME VNF 404 from the MME pool includes deleting the DN of the MME VNF 404 from the MME pool member list attribute of the MME pool.

The EM 420 acknowledges 466 the service decommission to the NM 422 by providing a notice of the service decommission to the NM 422. The NM 422 requests 468 the termination of the MME VNF 404. The NFVO 428 receives the request 468 and terminates 470 the MME VNF 404 instance and releases the virtual resources used by the MME VNF 404. That is, the NFVO 428 terminate the MME VNF 404 and can work with the VNFM 424 and the VIM 426 to release the VMs used to execute the MME VNF 404 and/or the network resources used to connect the MME VNF 404 to the mobile communication system. The NFVO 428 notifies 472 the NM 422 of the MME VNF 404 instance termination. The NM 422 receives the notification 472 and deletes 474 the MME function object by sending a request to delete the MME function to the EM 420. The EM 420 receives the request to delete 474 the MME function and deletes the MME function.

Figure 5:
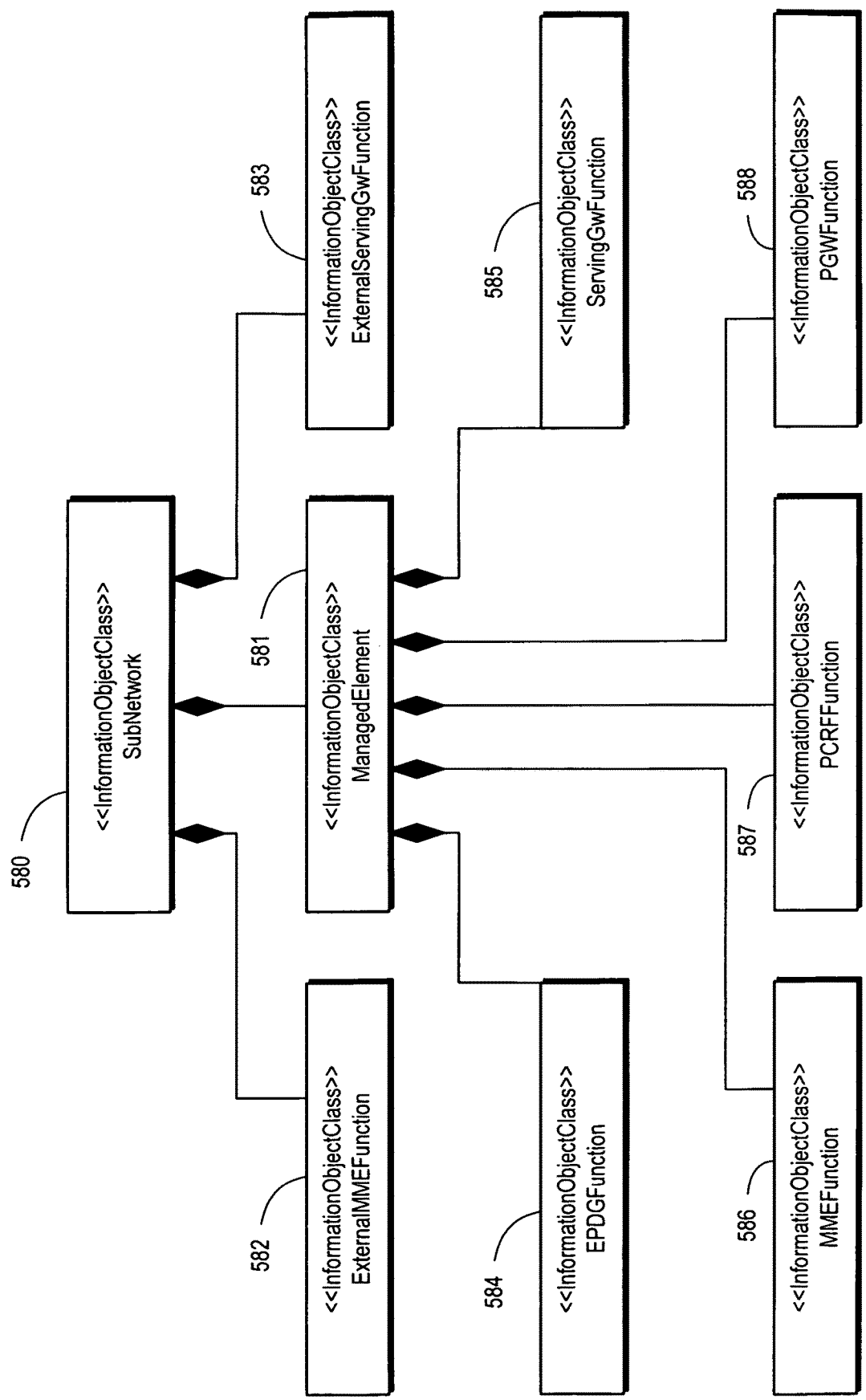
FIG. 5 is a block diagram for a managed element according to one embodiment.

FIG. 5 is a block diagram for a managed element according to one embodiment. FIG. 5 shows a SubNetwork class 580, a ManagedElement class 581, an External MMEFunction class 582, an ExternalServingGwFunction class 583, an EPDGFunction class 584, a ServingGwFunction 585, an MMEFunction class 586, a PCRFFunction class 587, and a PGWFunction class 588.

Each of the shown classes can be implemented to create an associated object. For example, the MMEFunction class 586 can be implemented to create an MME function object. Each of the above classes are included in the IOC (e.g., <<InformationObjectClass>>).

FIG. 5, shows that the ExternalMMEFunction class 583, the ManagedElement class 581, and the ExternalServingGwFunction class 582 are part of the SubNetwork class 580. The EPDGFunction class 584, the MMEFunction class 586, the PCRFFunction class 587, and the PGWFunction class 588 are part of the ManagedElement class 581.

The MMEFunction class 586 represents MMEs, the PCRFFunction class 587 represents PCRFs, the ServingGwFunction class 585 represents service gateways, the PGWFunction class 588 represents packet data network (PDN) gateways. When a public land mobile network (PLMN) (e.g., mobile communication network) is created initially, the ManagedElement class 581, the MMEFunction class 586, the PCRFFunction class 587, the ServingGwFunction class 585, and PGWFunction class 588 are created. For example, the above mentioned classes can be created manually.

The ManagedElement class 581 has the attributes shown in Table 1.

TABLE 1

Attributes of the ManagedElement class 581

| Attribute Name | Support Qualifier | Is Readable | Is Writable | Is Invariant | Is Notifiable |
|---|---|---|---|---|---|
| vendorName | M | M | | | M |
| userDefinedState | M | M | M | | M |
| swVersion | M | M | | | M |
| managedElementType | M | M | M | | M |
| vnfImageId | CM | M | M | | M |

The vendorName attribute represents the name of the vendor creating the MME VNF. The userDefinedState attribute represents the state of the VNF package (e.g., disabled, enabled, deletion pending). The swVersion attribute represents the version of the software. The vnfImageId attribute represents the ID of the VNF image. It is added to support a network function virtualization (NFV) and is applicable to virtualized networks.

When the MME VNF image is uploaded to the (NFVI) or server in a data center, a managed element object is created and the attributes in Table 1 are initialized to describe the MME VNF image.

Figure 6:
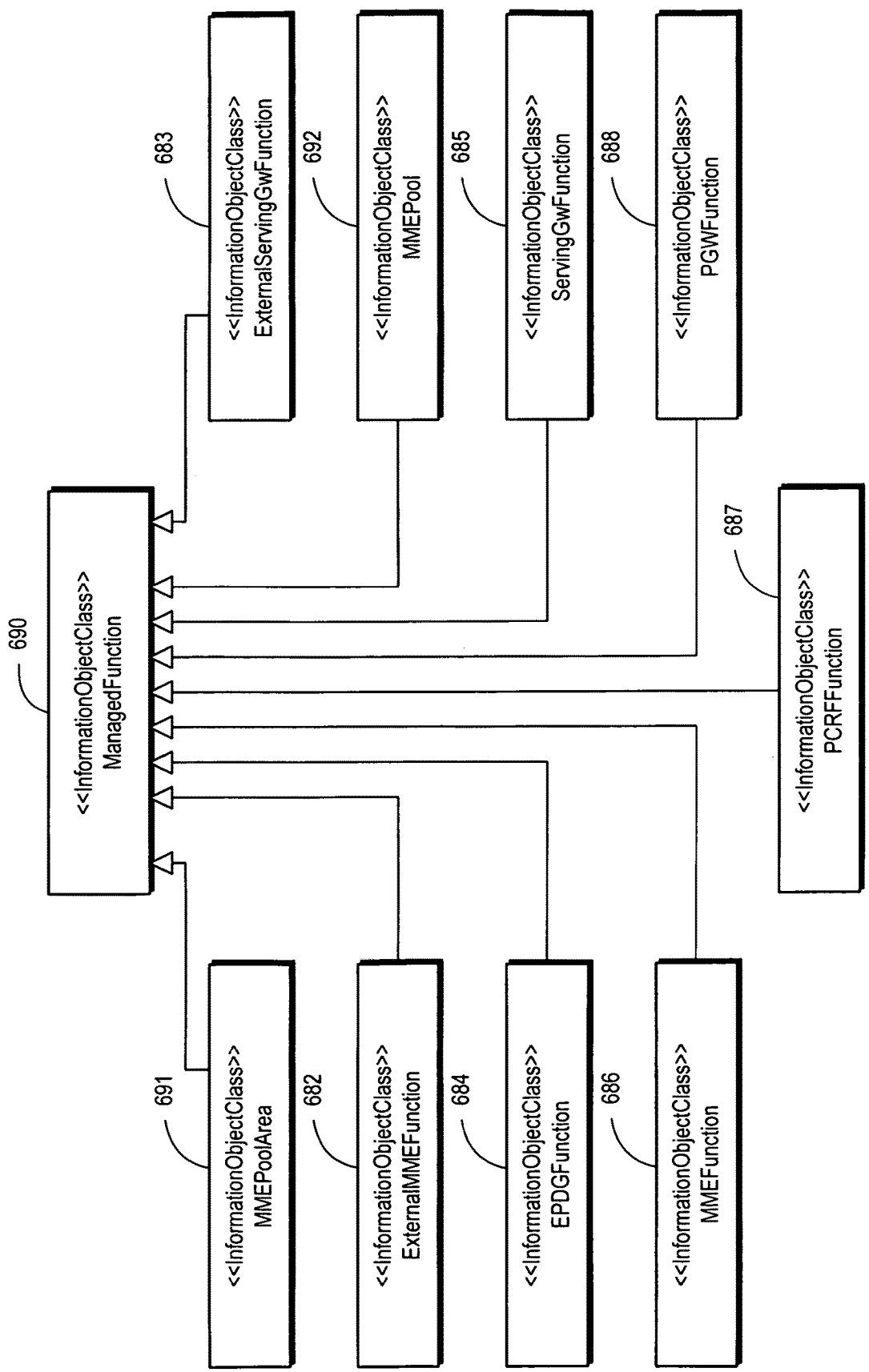
FIG. 6 is a block diagram for a managed function according to one embodiment.

FIG. 6 is a block diagram for a managed function according to one embodiment. FIG. 6 shows a ManagedFunction class 690. FIG. 6 also shows an ExternalMMEFunction class 682, an ExternalServingGwFunction class 683, an EPDGFunction class 684, a ServingGwFunction class 685, an MMEFunction class 686, a PCRFFunction class 687, a PGWFunction class 688, an MMEPoolArea class 691, and an MME Pool class 692, and which depend from the ManagedFunction class 690.

Table 2 shows the attributes of the ManagedFunction class 690.

TABLE 2

Attributes of the ManagedFunction class 690

| Attribute Name | Support Qualifier | Is Readable | Is Writable | Is Invariant | Is Notifiable |
|---|---|---|---|---|---|
| vnfInstanceId | CM | M | M | | M |

The vnfInstanceId represents the ID of the MME VNF instance. It is added to the ManagedFunction class 690 to support the NFV and is applicable to virtual networks.

Figure 7:
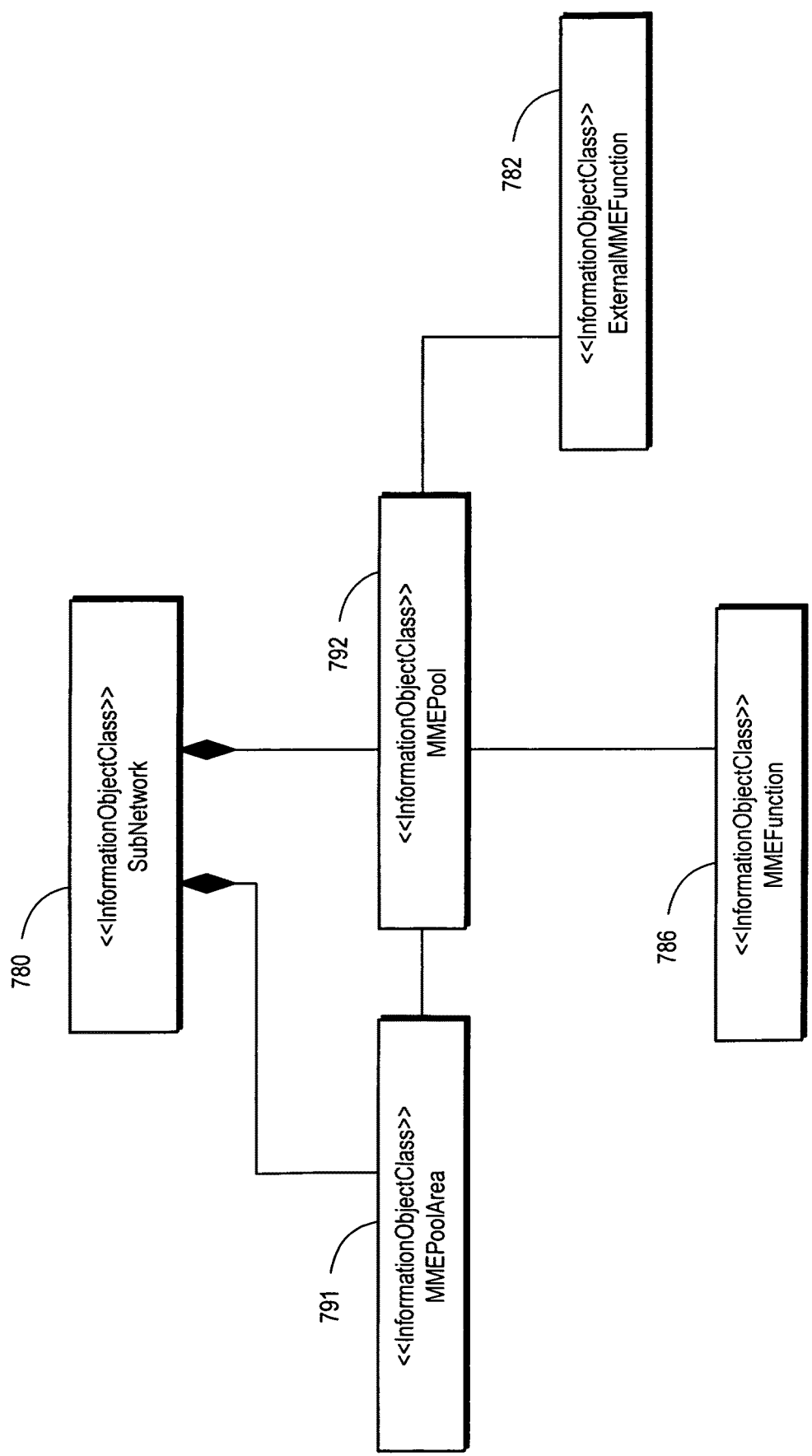
FIG. 7 is a block diagram for an mobile management entity pool according to one embodiment.

FIG. 7 is a block diagram for the MME pool according to one embodiment. FIG. 7 shows a SubNetwork class 780, an ExternalMMEFunction class 782, an MMEFunction class 786, an MMEPoolArea class 791, and an MMEPool class 792.

The MMEPoolArea class 791, the MMEPool class 792, the ExternalMMEFunction class 782, and the MMEFunction class 786 are part of the SubNetwork class 780. The MMEPool class 792 represents the MME pool. The MMEPoolArea class 791 represents the MME pool area.

The MME pool consists of one or more MMEs and/or MME VNFs. A particular MME and/or MME VNF can be a member of one MME pool.

The MME pool serves at most one MME pool area. One MME pool can be served by at most one MME pool. Table 3 describes the attributes of the MME pool.

TABLE 3

Attributes of the MMEPool class 792

| Attribute Name | Support Qualifier | Is Readable | Is Writable | Is Invariant | Is Notifiable |
|---|---|---|---|---|---|
| mMEGI | M | M | | | M |
| Attribute related to role | | | | | |
| mMEPoolMemberList | M | M | M | | M |
| mMEPoolArea | M | M | M | | M |

The mMEPoolMemberList attribute represents the list of MMEs and/or MME VNFs that belong to the MME pool. The mMEPoolMemberList is a list of DNs of the MME function representing the MME and/or MME VNF in the MME pool.

Table 4 describes the attributes of the MMEFunction class 786.

TABLE 4

Attributes of the MMEFunction class 786

| Attribute Name | Support Qualifier | Is Readable | Is Writable | Is Invariant | Is Notifiable |
|---|---|---|---|---|---|
| pLMNIdList | M | M | | | M |
| mMEC | M | M | | | M |
| Attribute related to role | | | | | |
| mMEPool | M | M | | | M |

The mMEPool attribute represents the MME pool to which the MME function belongs. The mMEPool attribute holds a DN of the MME pool to which the MME belongs.

Figure 8:
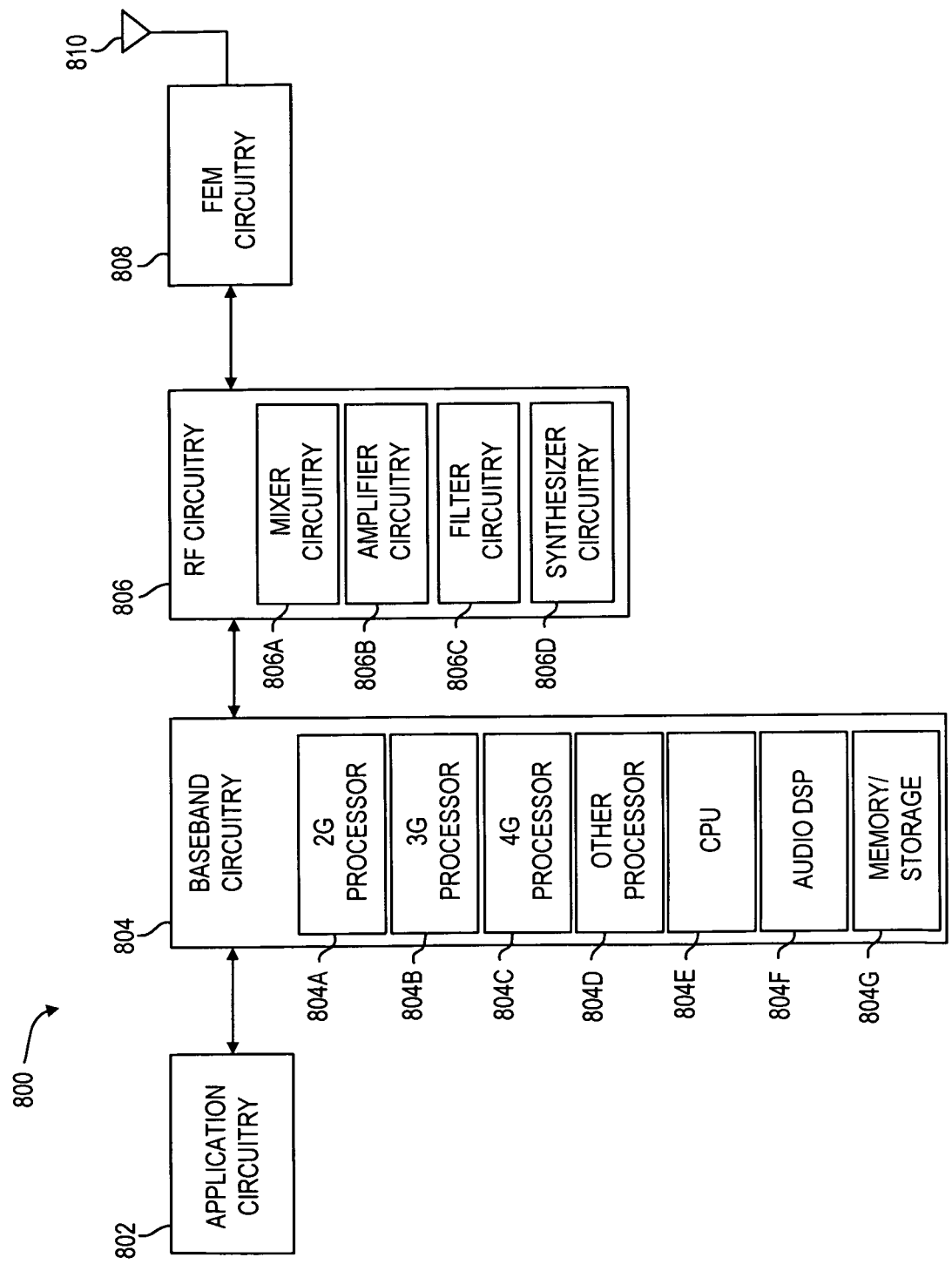
FIG. 8 is a block diagram for a device according to one embodiment.

FIG. 8 is a block diagram for a device 800 according to one embodiment. Embodiments described herein may be implemented into a system using any suitably configured hardware and/or software. In some embodiments, the device 800 may be a UE, eNB, an MME, a VMME, an EM, a NM, a VNF, a VIM, a NFVO, and/or a catalog. The device 800 can include an application circuitry 802, baseband circuitry 804, Radio Frequency (RF) circuitry 806, front-end module (FEM) circuitry 808, and/or one or more antennas 810, coupled together at least as shown in FIG. 8.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The application circuitry 802 may include one or more application processors. By way of non-limiting example, the application circuitry 802 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 804 may include one or more single-core or multi-core processors. The baseband circuitry 804 may include one or more baseband processors and/or control logic. The baseband circuitry 804 may be configured to process baseband signals received from a receive signal path of the RF circuitry 806. The baseband 804 may also be configured to generate baseband signals for a transmit signal path of the RF circuitry 806. The baseband processing circuitry 804 may interface with the application circuitry 802 for generation and processing of the baseband signals, and for controlling operations of the RF circuitry 806.

By way of non-limiting example, the baseband circuitry 804 may include at least one of a second generation (2G) baseband processor 804A, a third generation (3G) baseband processor 804B, a fourth generation (4G) baseband processor 804C, other baseband processor(s) 804D for other existing generations, and generations in development or to be developed in the future (e.g., fifth generation (5G), 6G, etc.). The baseband circuitry 804 (e.g.; at least one of baseband processors 804A-804D) may handle various radio control functions that enable communication with one or more radio networks via the RF circuitry 806. By way of non-limiting example, the radio control functions may include signal modulation/demodulation, encoding/decoding, radio frequency shifting, other functions, and combinations thereof. In some embodiments, modulation/demodulation circuitry of the baseband circuitry 804 may be programmed to perform Fast-Fourier Transform (FFT), precoding, constellation mapping/demapping functions, other functions, and combinations thereof. In some embodiments, encoding/decoding circuitry of the baseband circuitry 804 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 804 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804E of the baseband circuitry 804 may be programmed to run elements of the protocol stack for signaling of the PHY, MAC, RLC, PDCP and/or RRC layers. In some embodiments, the baseband circuitry 804 may include one or more audio digital signal processor(s) (DSP) 804F. The audio DSP(s) 804F may include elements for compression/decompression and echo cancellation. The audio DSP(s) 804F may also include other suitable processing elements.

The baseband circuitry 804 may further include memory/storage 804G. The memory/storage 804G may include data and/or instructions for operations performed by the processors of the baseband circuitry 804 stored thereon. In some embodiments, the memory/storage 804G may include any combination of suitable volatile memory and/or non-volatile memory. The memory/storage 804G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 804G may be shared among the various processors or dedicated to particular processors.

Components of the baseband circuitry 804 may be suitably combined in a single chip, a single chipset, or disposed on a same circuit board in some embodiments. In some embodiments, some or all of the constituent components of the baseband circuitry 804 and the application circuitry 802 may be implemented together, such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. The RF circuitry 806 may include a receive signal path which may include circuitry to down-convert RF signals received from the FEM circuitry 808, and provide baseband signals to the baseband circuitry 804. The RF circuitry 806 may also include a transmit signal path which may include circuitry to up-convert baseband signals provided by the baseband circuitry 804, and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B, and filter circuitry 806C. The transmit signal path of the RF circuitry 806 may include filter circuitry 806C and mixer circuitry 806A. The RF circuitry 806 may further include synthesizer circuitry 806D configured to synthesize a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals.

The filter circuitry 806C may include a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may include zero-frequency baseband signals, although this is not a requirement. In some embodiments, the mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by filter circuitry 806C. The filter circuitry 806C may include a low-pass filter (LPF), although the scope of the embodiments is not limited in this respect.

In some embodiments, the mixer circuitry 806A of the receive signal path and the mixer circuitry 806A of the transmit signal path may include two or more mixers, and may be arranged for quadrature downconversion and/or upconversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry 806A may be arranged for direct downconversion and/or direct upconversion, respectively. In some embodiments, the mixer circuitry 806A of the receive signal path and the mixer circuitry 806A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, separate radio IC circuitry may be provided for processing signals for each spectrum, although the scope of the embodiments is not limited in this respect.

In some embodiments, the synthesizer circuitry 806D may include one or more of a fractional-N synthesizer and a fractional N/N+1 synthesizer, although the scope of the embodiments is not limited in this respect as other types of frequency synthesizers may be suitable. For example, synthesizer circuitry 806D may include a delta-sigma synthesizer, a frequency multiplier, a synthesizer comprising a phase-locked loop with a frequency divider, other synthesizers and combinations thereof.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

The synthesizer circuitry 806D of the RF circuitry 806 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 806D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

The FEM circuitry 808 may include a receive signal path which may include circuitry configured to operate on RF signals received from one or more antennas 810, amplify the received signals, and provide the amplified versions of the received signals to the RF circuitry 806 for further processing. The FEM circuitry 808 may also include a transmit signal path which may include circuitry configured to amplify signals for transmission provided by the RF circuitry 806 for transmission by at least one of the one or more antennas 810.

In some embodiments, the FEM circuitry 808 may include a TX/RX switch configured to switch between a transmit mode and a receive mode operation. The FEM circuitry 808 may include a receive signal path and a transmit signal path. The receive signal path of the FEM circuitry 808 may include a low-noise amplifier (LNA) to amplify received RF signals and provide the amplified received RF signals as an output (e.g., to the RF circuitry 806). The transmit signal path of the FEM circuitry 808 may include a power amplifier (PA) configured to amplify input RF signals (e.g., provided by RF circuitry 806), and one or more filters configured to generate RF signals for subsequent transmission (e.g., by one or more of the one or more antennas 810.

In some embodiments, the device 800 may include additional elements such as, for example, memory/storage, a display, a camera, one or more sensors, an input/output (I/O) interface, other elements, and combinations thereof.

In some embodiments, the device 800 may be configured to perform one or more processes, techniques, and/or methods as described herein, or portions Example Embodiments Example 1, An element manager, comprising electronic memory and one or more processors configured to access the electronic memory to receive, from a network manager (NM), a request to create a management object instance, receive, from a virtual network function manager (VNFM), a notification of a successful instantiation of a virtual mobile management entity (VMME), create the management object instance in response to receiving the request and the notification, add the management object instance to a mobile management entity (MME) pool to manage a plurality of user equipment (UE) in a mobile communication system, and notify the NM of the creation of the management object instance.

Example 2, the element manager of example 1, wherein the managed object instance is a Managed Element Object.

Example 3, the element manager of example 1, wherein the management object instance is created with at least a user defined state attribute, a vendor name attribute, a version attribute, a managed element type attribute, and a virtual network function (VNF) image identification (ID) attribute.

Example 4, the element manager of example 1, further configured to modify attributes of the managed object instance in response to receiving a request to modify the attributes.

Example 5, the element manager of example 4, wherein at least the user defined state attribute is modified to an enabled value in response to a request from the NM.

Example 6, the element manager as in examples 1, 2, 3 or 4, further configured to create a mobile management entity MME function object that inherits from the managed object instance.

Example 7, the element manager as in examples 1, 2, 3 or 4, further configured to add the management object instance to the MME pool by setting an mMEPoolMemberList attribute of the MME pool object equal to a domain name (DN) of the MMEFunction object.

Example 8, the element manager of example 7, further configured to set the MMEPool attribute of the MMEFunction object equal to the DN of the MMEPool object.

Example 9, the computer-readable storage medium having stored thereon instructions that, when implemented by a computing device, cause the computing device to perform operations for a virtual mobile management entity virtual network function (MME VNF) instantiation, the operations comprising on-boarding a virtual network function (VNF) package in response to a request for mobile management entity (MME) resources, creating a management object instance in response to the on-boarding of the VNF package, enabling the VNF package based on the on-boarding of the VNF package in response to the creation of the management object instance, and instantiating a MME VNF based on the enablement of the VNF package in response to the enablement of the VNF package.

Example 10, the computer-readable medium of example 9, wherein on-boarding the VNF package further comprises submitting the VNF package to a network function virtualization orchestrator (NFVO) to be included in a catalog, and receiving an acknowledgement from the NFVO of a completion of the on-boarding of the VNF package.

Example 11, the computer-readable medium as in examples 9 or 10, wherein enabling the VNF package marks the VNF package as enabled at the catalog.

Example 12, the computer-readable medium of example 11, wherein enabling the VNF package further comprises sending a request to the NFVO to enable the VNF package, and receiving an acknowledgement from the NFVO of an enablement of the VNF package.

Example 13, the computer-readable medium as in examples 9 or 10, wherein instantiating the MME VNF further comprises sending a request to the NFVO to instantiate the MME VNF, and receiving an acknowledgement from the NFVO of an instantiation of the MME VNF.

Example 14, the computer-readable medium as in examples 9 or 10, wherein creating the management object instance further comprises sending, to an element manager (EM), a plurality of configuration management (CM) commands.

Example 15, the computer-readable medium of example 14, wherein the CM commands include, a command to create the management object instance, and a command to modify the attributes of the created management object instance.

Example 16, a system comprising, an element manager (EM) comprising one or more processors and configured to decommission virtual mobile management entity (VMME) services provided by a VMME and remove the VMME from a mobile management entity (MME) pool, and a virtual network function manager (VNFM) comprising one or more processors configured to terminate the VMME, and release the virtualized resources.

Example 17, the system of example 16, wherein the EM is further configured to request a move of a user equipment (UE) from the VMME to a different MME.

Example 18, the system as in examples 16 or 17, wherein the EM is further configured to remove the VMME from the MME pool by deleting a DN of the VMME from the mMEPoolMemberList attribute of the MME pool.

Example 19, the system as in examples 16 or 17, wherein the EM is further configured to delete the MMEFunction associated with the VMME.

Example 20, the system as in examples 16 or 17, further comprising the NM comprising one or more processors and configured to request a decommission of the VMME services, request a removal of the VMME from the MME pool, and request a termination of the VMME.

Example 21, a network function virtualization orchestrator (NFVO), comprising, electronic memory and one or more processors configured to access the electronic memory to, receive, from a network manager (NM), a request to on-board a virtual network function (VNF) package in response to a request for mobile management entity (MME) resources, on-board the VNF package, receive, from the NM, a request to enable the VNF package, enable the VNF package, receive, from the NM, a request to instantiate the VNF package, and instantiate the VNF package.

Example 22, the NFVO of example 22, wherein the NFVO instantiates the VNF package by requesting that a virtual infrastructure manager (VIM) start network and virtual resources.

Example 23, a method comprising receiving, from a virtual network function manager (VNFM), a notification of a successful instantiation of a virtual mobile management entity (VMME), creating the management object instance in response to receiving the request and the notification, adding the management object instance to a mobile management entity (MME) pool to manage a plurality of user equipment (UE) in a mobile communication system, and notifying the NM of the creation of the management object instance.

Example 24, the method of example 23, wherein the managed object instance is a Managed Element Object.

Example 25, the method of example 23, wherein the management object instance is created with at least a user defined state attribute, a vendor name attribute, a version attribute, a managed element type attribute, and a virtual network function (VNF) image identification (ID) attribute.

Example 26, the method of example 23, further comprising modifying attributes of the managed object instance in response to receiving a request to modify the attributes.

Example 27, the method of example 26, wherein at least the user defined state attribute is modified to an enabled value in response to a request from the NM.

Example 28, the method as in examples 23, 24, 25 or 26, further comprising creating a mobile management entity MME function object that inherits from the managed object instance.

Example 29, the method as in examples 23, 24, 25 or 26, further comprising adding the management object instance to the MME pool by setting an mMEPoolMemberList attribute of the MME pool object equal to a domain name (DN) of the MMEFunction object.

Example 30, the method of example 29, further comprising setting the MMEPool attribute of the MMEFunction object equal to the DN of the MMEPool object.

Example 31, a method, comprising on-boarding a virtual network function (VNF) package in response to a request for mobile management entity. (MME) resources, creating a management object instance in response to the on-boarding of the VNF package, enabling the VNF package based on the on-boarding of the VNF package in response to the creation of the management object instance, and instantiating a mobile management entity virtual network function (MME VNF) in response to the enablement of the VNF package.

Example 32, the method of example 31, wherein on-boarding the VNF package further comprises submitting the VNF package to a network function virtualization orchestrator (NFVO) to be included in a catalog, and receiving an acknowledgement from the NFVO of a completion of the on-boarding of the VNF package.

Example 33, the method as in examples 31 or 32, wherein enabling the VNF package marks the VNF package as enabled at the catalog.

Example 34, the method of example 33, wherein enabling the VNF package further comprises sending a request to the NFVO to enable the VNF package and receiving an acknowledgement from the NFVO of an enablement of the VNF package.

Example 35, the method as in examples 31 or 32, wherein instantiating the MME VNF further comprises sending a request to the NFVO to instantiate the MME VNF, and receiving an acknowledgement from the NFVO of an instantiation of the MME VNF.

Example 36, the method as in examples 31 or 32, wherein creating the management object instance further comprises sending, to an element manager (EM), a plurality of configuration management (CM) commands.

Example 37, the method of example 36, wherein the CM commands include a command to create the management object instance, and a command to modify the attributes of the created management object instance.

Example 38, a method comprising decommissioning virtual mobile management entity (VMME) services provided by a VMME, removing the VMME from a mobile management entity (MME) pool, terminating the VMME, and releasing the virtualized resources.

Example 39, the method of example 38, further comprising requesting a move of a user equipment (UE) from the VMME to a different MME.

Example 40, the method as in examples 37 or 38, further comprising removing the VMME from the MME pool by deleting a DN of the VMME from the mMEPoolMemberList attribute of the MME pool.

Example 41, the method as in examples 37 or 38, further comprising deleting the MMEFunction associated with the VMME.

Example 42, the method as in examples 37 or 38, further comprising requesting a decommission of the VMME services, requesting a removal of the VMME from the MME pool, and requesting a termination of the VMME.

Example 43, a method, comprising receiving, from a network manager (NM), a request to on-board a virtual network function (VNF) package in response to a request for mobile management entity (MME) resources, on-boarding the VNF package, receiving, from the NM, a request to enable the VNF package, enabling the VNF package, receiving, from the NM, a request to instantiate the VNF package, and instantiating the VNF package.

Example 44, the method of example 43, wherein instantiating the VNF package further comprises requesting that a virtual infrastructure manager (VIM) start network and virtual resources.

Example 45, at least one computer-readable storage medium having stored thereon computer-readable instructions, when executed, to implement a method as recited in any of examples 23-44.

Example 46, an apparatus comprising means to perform a method as recited in any of examples 23-44.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

What is claimed is:

1. An element manager, comprising:
   electronic memory;
   one or more processors configured to access the electronic memory to:
   receive, from a network manager (NM), a request to create a management object instance;
   receive, from a virtual network function manager (VNFM), a notification of a successful instantiation of a virtual mobile management entity (VMME);
   create the management object instance in response to receiving the request and the notification, wherein the management object instance is created with at least a user defined state attribute, a vendor name attribute, a version attribute, a managed element type attribute, and a virtual network function (VNF) image identification (ID) attribute;
   add the management object instance to a mobile management entity (MME) pool to manage a plurality of user equipment (UE) in a mobile communication system; and
   notify the NM of the creation of the management object instance.

2. The element manager of claim 1, wherein the managed object instance is a Managed Element Object.

3. The element manager of claim 1, further configured to modify attributes of the managed object instance in response to receiving a request to modify the attributes.

4. The element manager of claim 3, wherein at least the user defined state attribute is modified to an enabled value in response to a request from the NM.

5. The element manager of claim 1, further configured to create a mobile management entity MME function object that inherits from the managed object instance.

6. The element manager of claim 1, further configured to add the management object instance to the MME pool by setting an mMEPoolMemberList attribute of the MME pool object equal to a domain name (DN) of the MMEFunction object.

7. The element manager of claim 6, further configured to set the MMEPool attribute of the MMEFunction object equal to the DN of the MMEPool object.

8. A non-transitory computer-readable storage medium having stored thereon instructions that, when implemented by a computing device, cause the computing device to perform operations for a virtual mobile management entity virtual network function (MME VNF) instantiation, the operations comprising:
   on-boarding a virtual network function (VNF) package in response to a request for mobile management entity (MME) resources;
   creating a management object instance in response to the on-boarding of the VNF package, wherein the management object instance is created with at least a user defined state attribute, a vendor name attribute, a version attribute, a managed element type attribute, and a virtual network function (VNF) image identification (ID) attribute;
   enabling the VNF package based on the on-boarding of the VNF package in response to the creation of the management object instance; and
   instantiating a MME VNF based on the enablement of the VNF package in response to the enablement of the VNF package.

9. The non-transitory computer-readable medium of claim 8, wherein on-boarding the VNF package further comprises:
   submitting the VNF package to a network function virtualization orchestrator (NFVO) to be included in a catalog; and
   receiving an acknowledgement from the NFVO of a completion of the on-boarding of the VNF package.

10. The non-transitory computer-readable medium of claim 8, wherein enabling the VNF package marks the VNF package as enabled at a catalog.

11. The non-transitory computer-readable medium of claim 10, wherein enabling the VNF package further comprises:
    sending a request to a network function virtualization orchestrator (NFVO) to enable the VNF package; and
    receiving an acknowledgement from the NFVO of an enablement of the VNF package.

12. The non-transitory computer-readable medium of claim 8, wherein instantiating the MME VNF further comprises:
    sending a request to a network function virtualization orchestrator (NFVO) to instantiate the MME VNF; and
    receiving an acknowledgement from the NFVO of an instantiation of the MME VNF.

13. The non-transitory computer-readable medium of claim 8, wherein creating the management object instance further comprises sending, to an element manager (EM), a plurality of configuration management (CM) commands.

14. The non-transitory computer-readable medium of claim 13, wherein the CM commands include:
    a command to create the management object instance; and
    a command to modify the attributes of the created management object instance.

15. A method comprising:
    receiving, from a virtual network function manager (VNFM), a notification of a successful instantiation of a virtual mobile management entity (VMME);
    in response to the notification and a request to create a management object instance, creating the management object instance, wherein the management object instance is created with at least a user defined state attribute, a vendor name attribute, a version attribute, a managed element type attribute, and a virtual network function (VNF) image identification (ID) attribute;
    adding the management object instance to a mobile management entity (MME) pool to manage a plurality of user equipment (UE) in a mobile communication system; and notifying the NM of the creation of the management object instance.

\* \* \* \* \*